United States Patent

Baltzley

[19]

[11] Patent Number: 6,154,543

[45] Date of Patent: Nov. 28, 2000

[54] PUBLIC KEY CRYPTOSYSTEM WITH ROAMING USER CAPABILITY

[75] Inventor: Cliff A. Baltzley, Austin, Tex.

[73] Assignee: Hush Communications Anguilla, Inc.

[21] Appl. No.: 09/200,640

[22] Filed: Nov. 25, 1998

[51] Int. Cl.[7] .................................................. G09C 3/08
[52] U.S. Cl. ........................... 380/255; 380/259; 705/74; 713/150; 713/201
[58] Field of Search ................................... 380/255, 259; 705/64, 74, 75; 713/150

[56] References Cited

U.S. PATENT DOCUMENTS

| | | | |
|---|---|---|---|
| 4,200,770 | 4/1980 | Hellman et al. | 178/22 |
| 4,405,829 | 9/1983 | Rivest et al. | 178/22.1 |
| 5,619,574 | 4/1997 | Johnson et al. | 380/25 |
| 5,748,735 | 5/1998 | Ganesan | 380/21 |
| 5,757,916 | 5/1998 | MacDoran et al. | 380/25 |
| 5,903,652 | 5/1999 | Mital | 380/25 |
| 5,987,440 | 11/1999 | O'Neil et al. | 705/44 |

Primary Examiner—Thomas R. Peeso
Assistant Examiner—Todd Jack
Attorney, Agent, or Firm—Gray Cary Ware & Freidenrich LLP

[57] ABSTRACT

A public key cryptosystem with roaming user capability within a network that allows secure communication between users of the system, client machines, and encryption servers. A client machine generates and stores an encrypted private key on an encryption server. A user may then access the encrypted private key from any client machine located on the network and decrypt it using a passphrase, thus giving the user roaming capability. The private key may then be used to decrypt any encrypted messages received. A user can generate a digital message, encrypt it with a client recipient's public key, and transmit it to the encryption server from any client machine on the network.

59 Claims, 5 Drawing Sheets

PUBLIC KEY CRYPTOSYSTEM WITH ROAMING USER CAPABILITY

TECHNICAL FIELD OF THE INVENTION

This invention relates in general to encryption of data in communication systems. In particular, this invention relates to a system and method for managing public/private key pairs within a cryptosystem having roaming user capability.

BACKGROUND OF THE INVENTION

Encrypted voice and data communication systems are well known in the art. These cryptosystems allow a user to digitally transmit information to one or more system users without it being intercepted and interpreted. This is accomplished by encrypting and decrypting the transmitted information with what is known as an encryption key. Encryption keys may be secret keys, where a single key is utilized for encryption and decryption, or public keys, where two or more keys are used.

Cryptosystems which utilize secret keys and public keys are well known in the art. Each type of cryptosystem provides some degree of privacy and authentication for digital communications. Secret-key cryptosystems utilize the traditional method known as symmetric key cryptography. In a symmetric key cryptosystem, a single electronic key is used both to encrypt and decrypt the transmitted information. Since only one key is used, the sender must provide the receiver with the key by some form of secure communication. The lack of a secure channel, which is usually why encryption is used in the first place, makes this system mostly obsolete in common practice these days.

Public-key cryptosystems, also referred to as asymmetric cryptosystems, provide another means of encrypting information. Such cryptosystems differ from secret-key cryptosystems in that two or more keys are required as opposed to one. In a public-key cryptosystem, each entity has a private key and a public key. Public keys are generally held in databases run by "Key Certificate Authorities" and are publicly known. However, each user's private key is known only by that user. Once a sender encrypts a message with a recipient's public key, it can only be decrypted using that recipient's private key. Because the computational power required to break a key increases exponentially with the length of key, longer keys provide greater security.

Private keys are usually between 512 and 4096 bits long, far too long for the average person to commit to memory. For this reason, most users of a public key cryptosystem store their private key on a personal computer or other personal device. The problem with this practice is that private key may be lost if the computer software crashes or computer hardware fails. In most cases, the user may have not "backed up" their data. This situation occurs more often than is convenient. In the event that the user wrote down the private key in a "safe" place and then lost it, the result is the same.

If or when this private key is lost or stolen, and thus compromised, a complicated "Key Revocation" process occurs. The user must perform the embarrassing task of informing all other users with whom he or she communicates with that the public/private key pair is no longer valid, and provide them with a new public key to use instead.

Another major drawback with current public key cryptosystems is that the users must have their private key with them to read any of their messages. This becomes a problem when the user is traveling and the private key is stored on their personal computer at home. In the current age of "roaming email" and other roaming communication, the technology is readily available for users to check their messages almost anywhere in the world. If the users do not have their private key with them, they cannot retrieve their messages. If the users do carry their private key with them while traveling, there is the risk that the private key may be lost or stolen. Furthermore, it is not always easy or convenient for users to carry around a piece of digital data with them that quickly integrates with other digital hardware worldwide.

SUMMARY OF THE INVENTION

The present invention provides a system and method for transmitting secure digital electronic messages over communication channels in a way that substantially eliminates or reduces disadvantages and problems associated with previously developed cryptosystems.

More specifically, the present invention provides a system and method for providing a public key cryptosystem having roaming user capability. The public key cryptosystem with roaming user capability comprises a network having multiple client computers and multiple encryption servers. The network allows secure communication between the client computers and the encryption servers.

In one embodiment, the client computer executes a New User computer program and an Enabler computer program to facilitate secure communication. Both the New User computer program and the Enabler computer program communicate with a Server computer program located on the encryption server. The New User computer program communicates with the Server computer program to generate a public/private key pair, a user identifier, and a user passphrase. The private key is then encrypted with the user passphrase yielding an encrypted private key, which is transmitted with the public key to the encryption server.

The Enabler computer program communicates with the Server computer program to enable a user to both read encrypted digital messages sent to him or her and send encrypted digital messages to other users. To read encrypted digital messages sent to a user, the user is first prompted for a passphrase. The passphrase is then hashed and transmitted to the encryption server for authentication. Once the hashed passphrase is authenticated, the encryption server transmits the user's encrypted private key back to the client computer, where it is decrypted. The user may now use the private key to read any digital messages he has received.

The Enabler computer program and the Server computer program also work in conjunction to send encrypted digital messages. Once a digital message is generated, it is encrypted with a client recipient's public key. The encrypted message is then transmitted to the client recipient computer.

The present invention provides an important technical advantage by providing a way to securely store a user's private key on an encryption server by symmetrically encrypting it with a passphrase so that no one but the user has access to it.

The present invention provides another important technical advantage by providing a way to securely store a user's private key on an encryption server so a user may access the private key from any client machine on the encryption server network, thus providing roaming capability.

The present invention provides another important technical advantage by providing a way to access an encrypted private key from any client machine on a network by simply remembering a user passphrase.

The present invention provides another important technical advantage by providing a way to store an encrypted private key on an encryption server instead of the user's client machine, thus preventing the loss of the private key in the event the client machine crashes or fails.

The present invention provides another important technical advantage by limiting the number of times a user may try to log-in to the network per hour so a hacker cannot break into the system and retrieve the user's encrypted private key.

The present invention provides another important technical advantage by providing a user friendly public key cryptosystem where the user need not understand how to generate, send, or receive a public/private key pair since all this is handled by the New User computer program, Enabler computer program and the Server computer program.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

Figure 1:
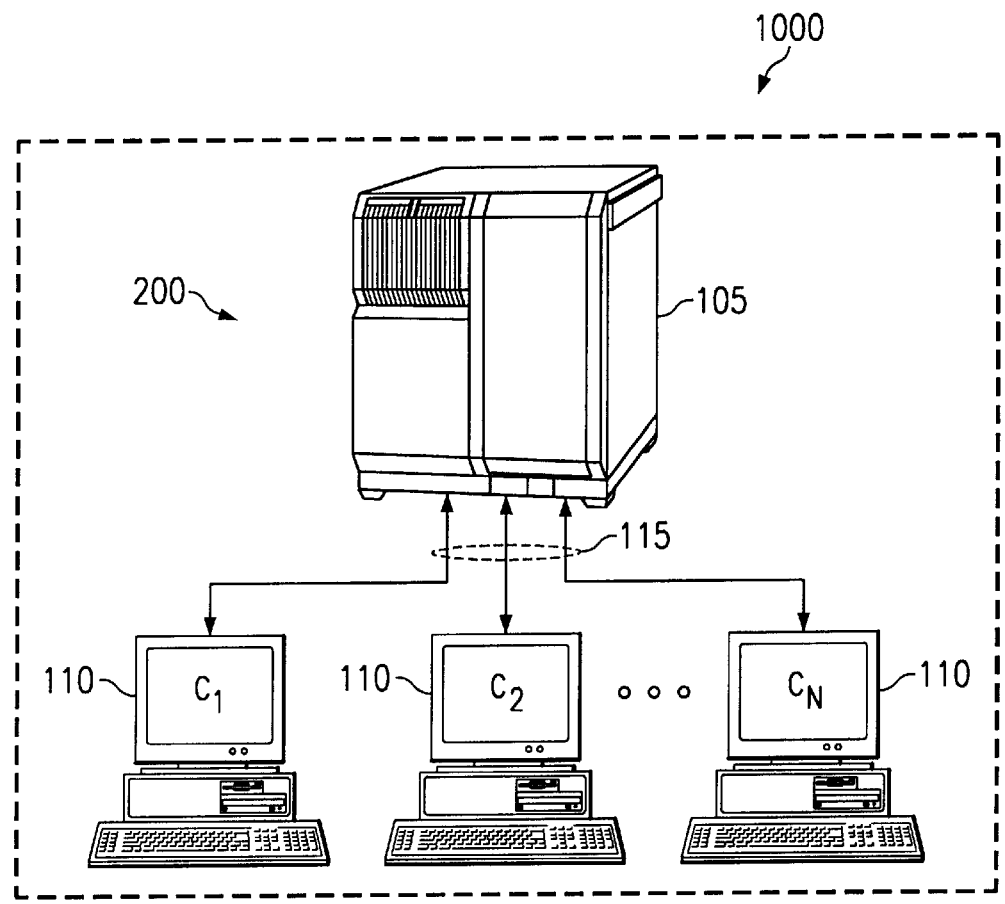
FIG. 1 shows one embodiment of a communications network system comprising an encryption server, multiple client machines, multiple users, and communication channels in accordance with the invention.

FIG. 1 shows one embodiment of the public key cryptosystem with roaming user capability 200 of the present invention within a communication network system 1000 comprising an encryption server 105 connected to a network of multiple client machines 110 through communication channels 115 which may each be comprised of a secure socket layer. The public cryptosystem with roaming user capability 200 may have a firewall or any other security devices placed between the encryption server 105 and the client machines 110 to further secure the encryption server 105 from being hacked or broken into.

Figure 2:
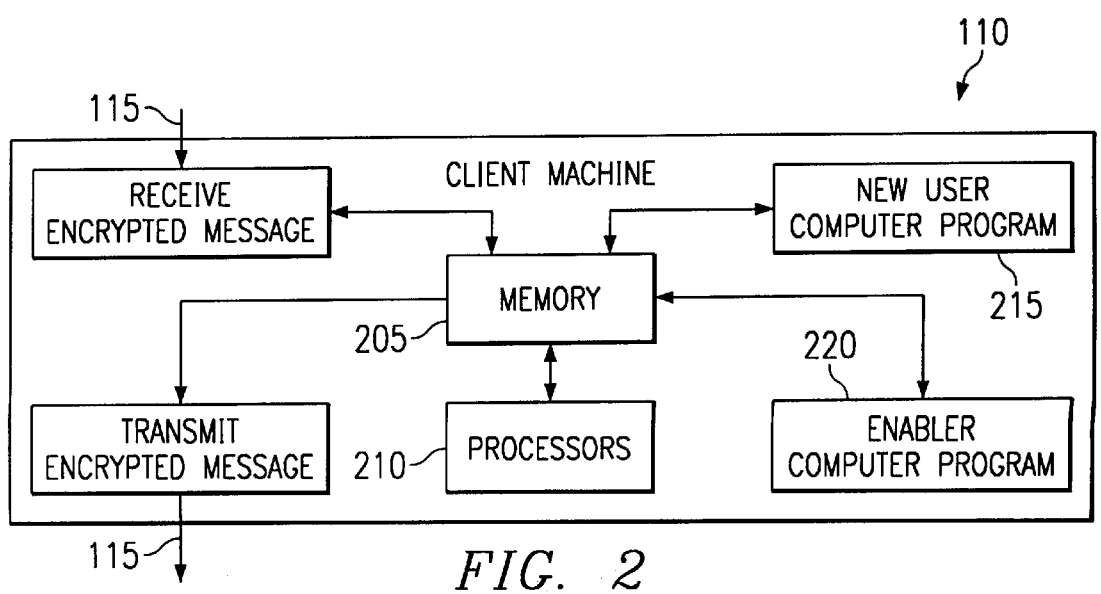
FIG. 2 shows a diagram of a client machine comprising incoming and outgoing communication channels, a New User computer program, an Enabler computer program, memory, and processors.

FIG. 2 shows a client machine 110 which can comprise incoming and outgoing communication channels 115, a memory 205, and one or more processors 210, such as microprocessors or digital signal processors. Memory 205 can include any storage medium, including RAM, a hard drive, and tape memory. The processors 210 are electrically connected to the memory 205 and have access to a New User computer program 215 and an Enabler computer program 220. The New user computer program 215 and Enabler computer program 220 may be downloaded from the encryption server 105 and stored in memory 205 of client machine 110 or directly installed in the memory 205 of client machine 110 from some other source. Both the New User computer program 215 and Enabler computer program 220 communicate with a Server computer program located in memory 305 of the encryption server 105. One example of a client machine 110 is an IBM compatible computer, however, it should be understood that the client machine 110 can be any communication unit which contains input and output communication channels 115, memory 205, and processors 210.

Figure 3:
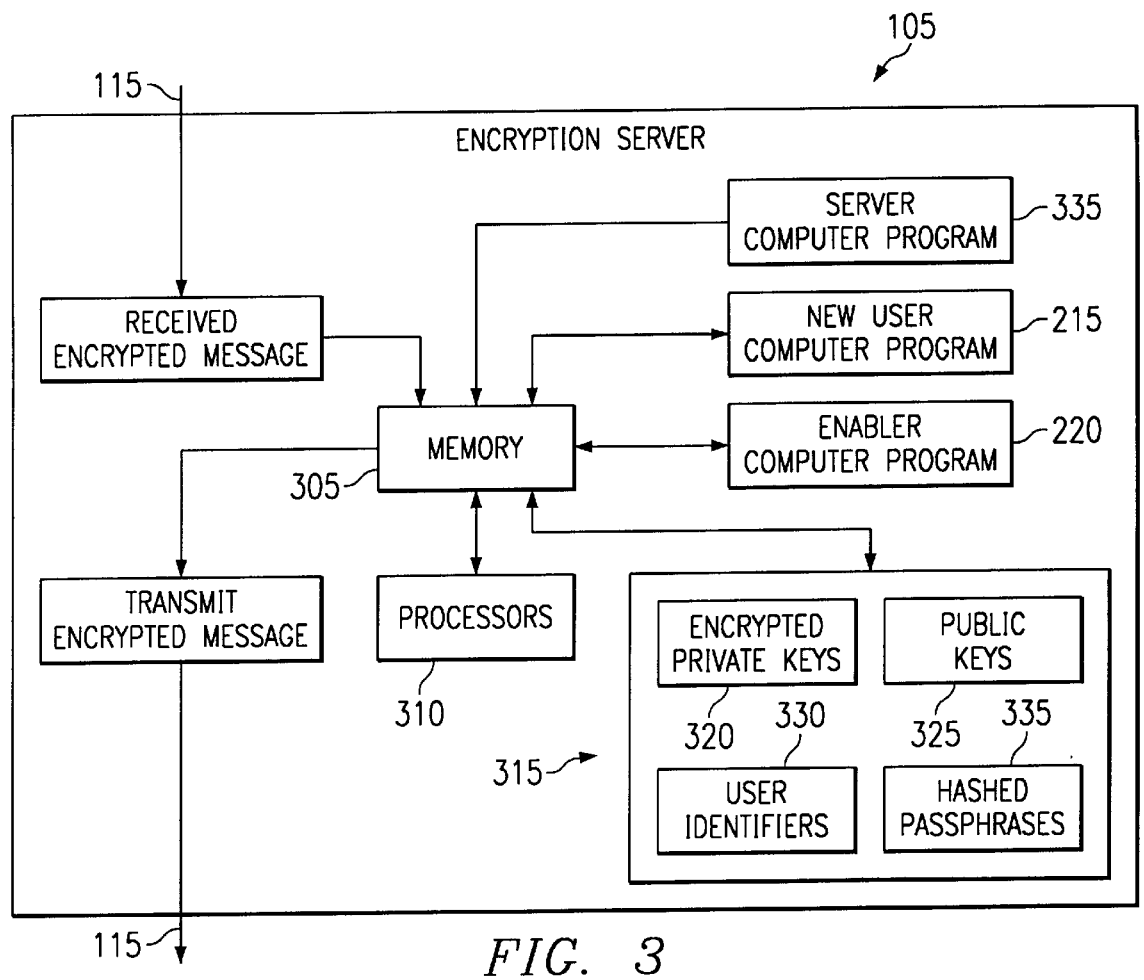
FIG. 3 shows a diagram of an encryption server comprising incoming and outgoing communication channels, a New User computer program, an Enabler computer program, a Server computer program, memory, processors, and a database having a plurality of encrypted private keys, public keys, user identifiers and hashed passphrases.

FIG. 3 shows an encryption server 105 which may comprise input and output communication channels 115, a memory 305, a database 315, and one or more processors 310, such as microprocessors or digital signal processors. The database 315 may comprise a plurality of encrypted private keys 320, a plurality of public keys 325, a plurality of user identifiers 330 and a plurality of hashed passphrases 335. The user identifiers could be a log-in ID, or a passphrase. The processors 310 are electrically connected to the memory 305 and have access to a Server computer program 335. The Server computer program 335 may be divided into two or more subprograms. The New User computer program 215 and an Enabler computer program 220 may be resident on the encryption server 105 and accessible by the client machines 110. One example of an encryption server 105 is a Sun Spare Station 5, however, it should be understood that the encryption server 105 can be any communication unit which contains input and output communication channels 115, memory 305, and processors 310.

Figure 4:
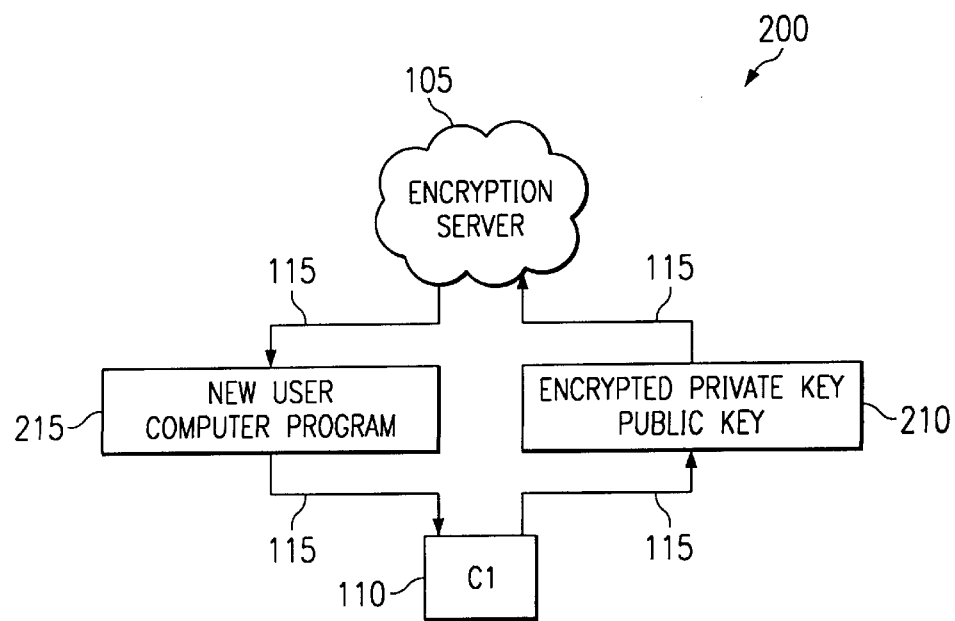
FIG. 4 shows a system diagram of an encryption server downloading a New User computer program, running the New User computer program on a client machine, and transmitting an encrypted private key and public key back to the encryption server in accordance with this invention.

FIG. 4 shows one embodiment of the public key cryptosystem with roaming user capability 200 where a user may access a web page on the client machine 110 and download the New User computer program 215 to the client machine 110 from the encryption server 105. The New User computer program 215 may also be downloaded from a server outside the network 1000 or directly loaded on to the client machine 110 from another source. The New user computer program 215 directs the client machine 110 to generate a user identifier 330, a private key, and a public key 325. The New User computer program 215 then encrypts the private key and transmits the encrypted private key 320 and public key 325 back to the encryption server 105. The Server computer program 335 directs the encryption server 105 to receive the encrypted private key 320 and the public key 325 from the client machine 110 and store them in the encryption server 105 database 315.

Figure 5:
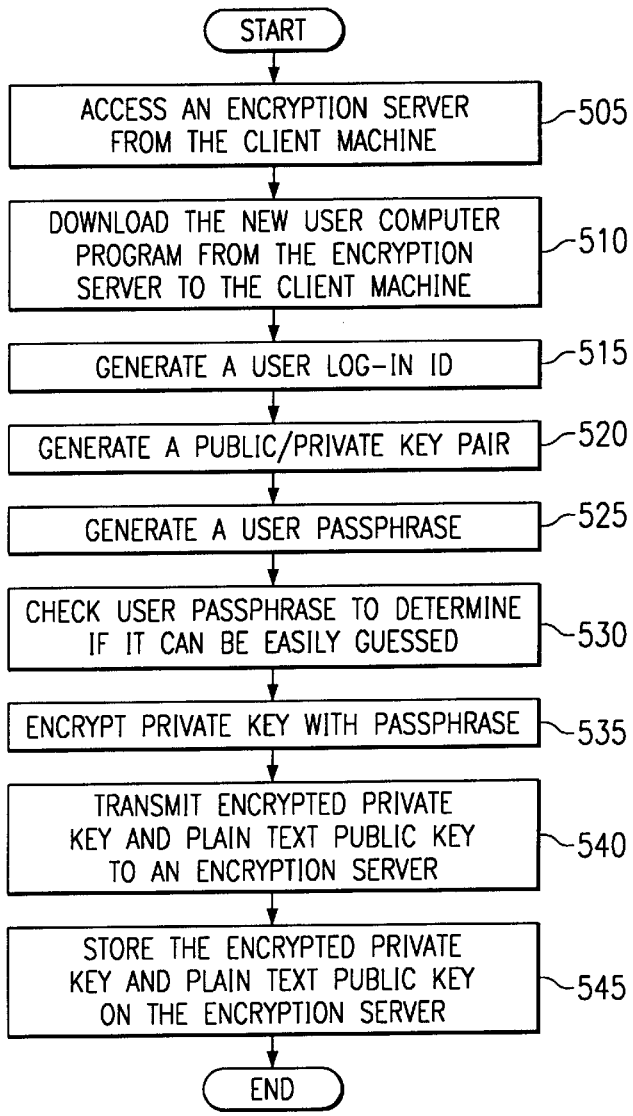
FIG. 5 shows a flow chart detailing the functions performed by the New User computer program in accordance with this invention.

FIG. 5 shows the steps performed by one embodiment of the New User computer program 215 working in conjunction with the Server computer program 335. The user first accesses an encryption server 105 from the client machine 110 as stated in step 505. The encryption server 105 may be accessed from the client machine 110 through an encryption server 105 web page. The user then downloads the New User computer program 215 from the encryption server 105 to the client machine 110 in step 510. At steps 515, 520 and 525 respectively, the New User computer program 215, which may be written in a number of different computer languages including JAVA, generates a user identifier 330, private key, public key 325, and prompts the user for a user passphrase. The user may choose his own passphrase or let the New user computer program 215 generate it for him. True random numbers needed to facilitate key generation may be actively or passively generated by the user during this time. The New user computer program 215 then communicates with the Server computer program 335 and compares the hash of the user passphrase against a large database of hashed English words, hashed common nouns, and hashed popular sayings to assure that the hash of the passphrase chosen cannot be easily guessed in step 530. If the passphrase is determined to be easily guessable, the user has the option to either keep the passphrase or generate a new one. The New User computer program 215 then encrypts the private key with the passphrase in step 535. The private key may be encrypted with a number of different ciphers, including a symmetrical cipher such as Blowfish or DES. In step 540, the encrypted private key 320 and public key 325 are then transmitted to the encryption server 105. Finally, the Server computer program 335 stores the encrypted private key 320 and public key 325 on the encryption server 105 in step 545. In another embodiment, the New User computer program 215, the Enabler computer program 220, the encrypted private key 320, and other user preference information may be stored on the client machine 110 as well as transmitting and storing it on the encryption server 105 to save download transmission time.

By storing the encrypted private key 320 on the encryption server 105, the user enjoys some added benefits. First, the user may access and download the encrypted private key 320 from any client machine 110 on the network 1000, thus giving the user roaming capability. Second, storing the encrypted private key 320 on the encryption server 105 eliminates the need for the user to remember or carry his or her private key. All the user needs to remember to access the encrypted private key 320 is a passphrase. This is considerably easier than remembering a private key which may be as large as 2,048 bits. Third, since the user's private key is stored on the encryption server 105 in encrypted form, only the user may retrieve and decrypt the private key. Neither an encryption server 105 administrator nor anyone else would be able to decrypt the private key.

Figure 6:
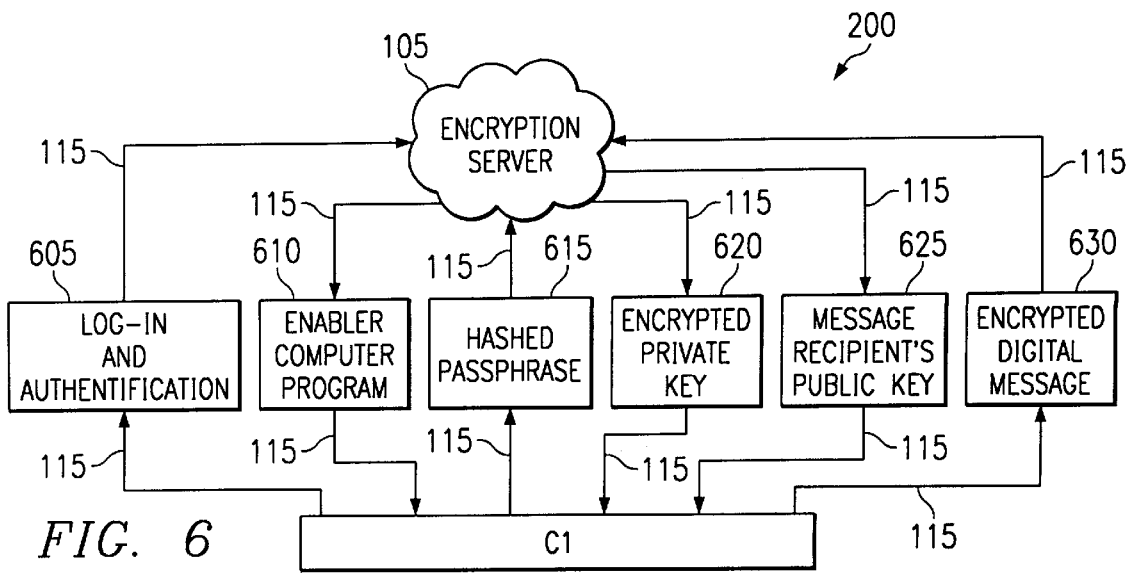
FIG. 6 shows a system diagram of the process of logging-in to the encryption server from a client machine, downloading the Enabler computer program to the client machine, transmitting a hashed passphrase to the encryption server, downloading the encrypted private key, downloading a client recipient's public key, and generating and sending an encrypted digital message to the encryption server in accordance with the invention.

FIG. 6 shows one embodiment of the public key cryptosystem with roaming user capability 200 depicting the process by which a client machine 110 transmits a digital message to the encryption server 105. First, the user logs-in to the encryption server 105 in step 605. Here, the server is authenticated to the user by industry standard means, such as SSL using authentication certificates. For security purposes, a user may be limited to a certain number of log-in sessions per hour, such as forty, to prevent someone from trying to break into the network 1000 and obtain a user's encrypted private key 320. The encryption server 105 then downloads the Enabler computer program 220 to the client machine 110 in step 610. The user then enters his or her passphrase, hashes the passphrase, and transmits the hashed passphrase to the encryption server 105 in step 615. In step 620, the encryption server 105 authenticates the hashed passphrase and transmits the encrypted private key 320 back to the client computer 110. In step 625, the user may decrypt the encrypted private key 320 with his or her passphrase, generate a digital message, and obtain a message recipient's public key 325 from the encryption server 105. Finally, in step 630, the user may encrypt the digital message with the recipient's public key 325, optionally signing the digital message with the client sender's private key, and transmit the encrypted digital message to the encryption server 105. All public keys 325 of message recipients may be temporarily or permanently stored on the client machine 110 for speed in future message sending.

Once the encrypted digital message is stored on the encryption server 105, the client recipient to whom the encrypted digital message is directed may retrieve and decrypt the encrypted digital message with his private key. The digital message may be email, real-time chat, or any other form of digital message which may be transmitted over the network 1000.

In another embodiment, the encrypted digital message does not have to be stored on the encryption server 105, but may instead be transmitted in any convenient way to the digital message recipient. For real time data that is time or bandwidth sensitive, (e.g., real time voice communication) encrypted digital message data may flow directly between both communicating client machines 110. The encryption server 105 is only necessary for user key storage.

In the process depicted in FIG. 6, the user passphrase, plaint text private key, or encrypted private key 320 remains on the client machine 110 only for the duration of time in which the user is logged-in to the network 1000. As soon as the user logs-off of the network 1000, the passphrase is erased from the client machine 110.

In another embodiment, the user passphrase, or private key may not be erased after logging-off the network 1000. In this embodiment, the user passphrase or private key remain on the computer so the user rarely has to retype their passphrase or download the encrypted private key 320 from the encryption server 105. The user passphrase or plain text private key, are never transmitted to the encryption server 105.

Figure 7:
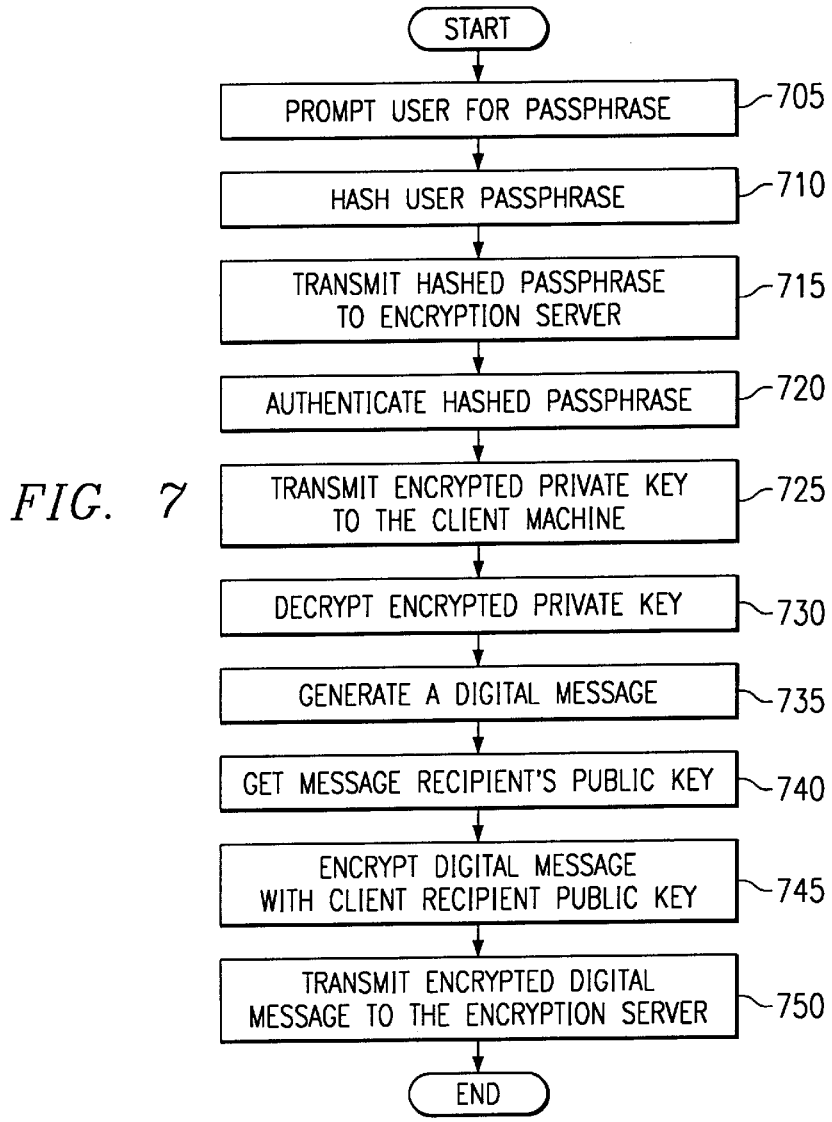
FIG. 7 shows a flow chart detailing the functions performed by the Enabler computer program in accordance with this invention.

FIG. 7 details the functions performed by one embodiment of the Enabler computer program 220 working in conjunction with the Server computer program 335. In step 705, the Enabler computer program 220 first prompts the user for a passphrase. The passphrase is then hashed and transmitted to the encryption server 105 in steps 710 and 715. The Server computer program 335 authenticates the hashed passphrase and transmits the encrypted private key 320 back to the client machine 110 in steps 720 and 725. The Server computer program 335 may also transmit other user information from the encryption server 105 to the client machine 110. In step 730, the Enabler computer program 220 then decrypts the encrypted private key 320 at the client machine 110. At this point, the user may use his or her private key to access his or her digital messages.

The Enabler computer program 220 also allows the user to generate a digital message and obtain a recipient's public key 325 from the encryption server 105 as shown in step 735 and 740. Finally, in steps 745 and 750, the Enabler computer program 220 encrypts the digital message with a client recipient public key 325 and transmits the encrypted digital message to the encryption server 105. A cyclic redundancy check (CRC) may be added to the end of the digital message before encrypting it for added security. A couple of examples of ciphers which may be used to encrypt the digital message are the standard RSA cipher or the Diffie-Helman cipher.

Figure 8:
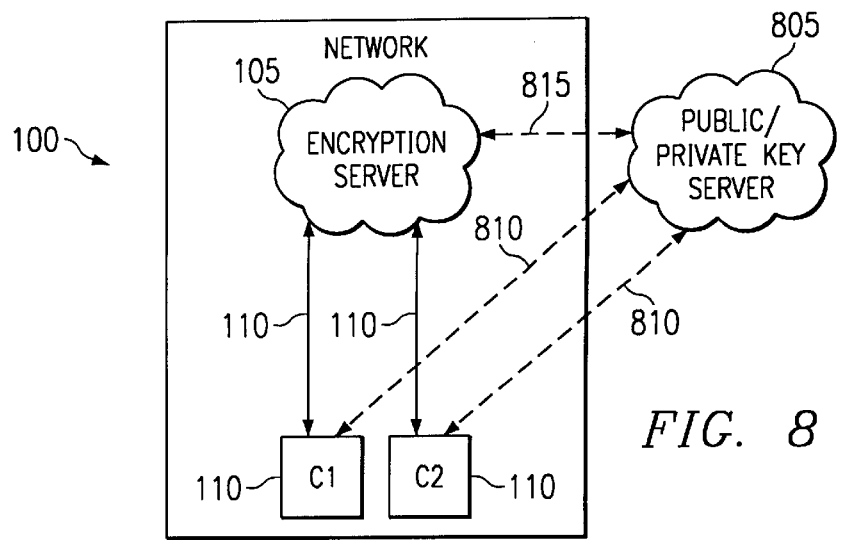
FIG. 8 shows another embodiment of a communications network comprising an encryption server, a plurality of client machines, and a public/private key server located outside the communications network.

FIG. 8 shows another embodiment of the public key cryptosystem with roaming user capability 1000 where the client machines C1 and C2 may communicate with a public key server 805 located outside the network 1000. The encryption server 105 may also communicate with the public key server 805 through communication channel 815. Communication with the public key server 805 is made possible through a Translator program which may be stored on the encryption server 105. First, a user may download the Enabler computer program 220 to client machine C1. The user may then execute the Enabler computer program 220 and transmit an encrypted digital message from client machine C1 to the public key server 805 through communication channels 810. A user of client machine C2 may then retrieve the digital message from the public key server 805, download the Enabler computer program 220 from the encryption server 105, and decrypt the retrieved encrypted digital message.

Figure 9:
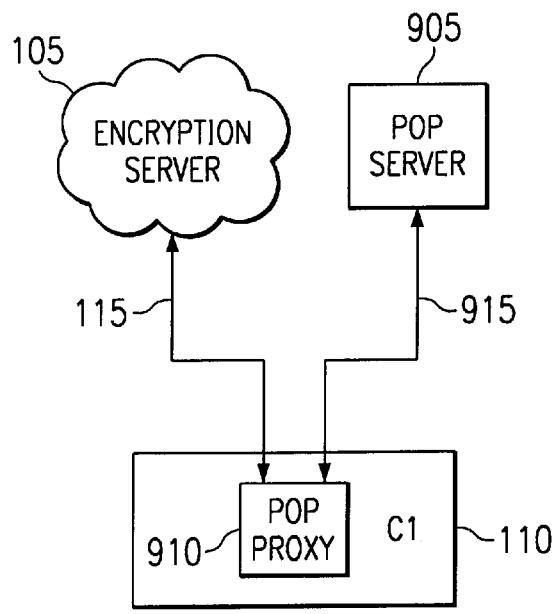
FIG. 9 shows another embodiment of a communications network comprising an encryption server, a pop server, and a client machine containing a pop proxy.

FIG. 9 shows another embodiment of the public key cryptosystem with roaming user capability 200 where a user transmits and receives digital messages through a pop proxy 910. This embodiment comprises an encryption server 105, a client machine 110 containing a pop proxy 910, and a pop server 905. A user first downloads a pop proxy 910 application to his or her client machine 110. The pop proxy 910 is then installed and configured to be the pop address that client machine 110 connects to. The pop proxy 910 is connected to and communicates directly with a pop account located on pop server 905 through communication channel 915. The pop proxy 910 is also connected to the encryption server 105 through communication channels 115 and has access to both the New User computer program 215 and the Enabler computer program 220.

Once the pop proxy 910 is installed and configured on the client machine 110, the user may access a web page on the client machine 110 and download the New User computer program 215 to the pop proxy 910 from the encryption server 105. The New user computer program 215 directs the client machine 110 to generate a user identifier 330, a private key, and a public key 325. The New User computer program 215 then encrypts the private key and transmits the encrypted private key 320 and public key 325 back to the encryption server 105. The Server computer program 335 directs the encryption server 105 to receive the encrypted private key 320 and the public key 325 from the client machine 110 and store them in the encryption server 105 database 315.

To transmit a digital message from the system depicted in FIG. 9, the user first logs-in to the encryption server 105. Here, the server is authenticated to the user by industry standard means, such as SSL using authentication certificates. For security purposes, a user may be limited to a certain number of log-in sessions per hour, such as forty, to prevent someone from trying to break into the network 1000 and obtain a user's encrypted private key 320. The encryption server 105 then downloads the Enabler computer program 220 to the pop proxy 910. The user then enters his or her passphrase, hashes the passphrase, and transmits the hashed passphrase to the encryption server 105.

Next, the encryption server 105 authenticates the hashed passphrase and transmits the encrypted private key 320 back to the client computer 110. The user may now decrypt the encrypted private key 320 with his or her passphrase, generate a digital message, and obtain a message recipient's public key from the pop server 905. Finally, the user may encrypt the digital message with the recipient's public key, optionally signing the digital message with the client sender's private key, and transmit the encrypted digital message to the pop server 905. All public keys of message recipients may be temporarily or permanently stored on the pop proxy 910 for speed in future message sending.

Once the encrypted digital message is stored on the pop server 905, the pop server 905 client recipient to whom the encrypted digital message is directed may retrieve and decrypt the encrypted digital message with his private key. The digital message may be email, real-time chat, or any other form of digital message which may be transmitted over the network 1000.

In another embodiment, the encrypted digital message does not have to be stored on the pop server 905, but may instead be transmitted in any convenient way to the digital message recipient. For real time data that is time or bandwidth sensitive, (e.g., real time voice communication) encrypted digital message data may flow directly between both communicating client machines 110.

In the process depicted in FIG. 6, the user passphrase, plaint text private key, or encrypted private key 320 remains on the pop proxy 910 only for the duration of time in which the user is logged-in to the network 1000. As soon as the user logs-off of the network 1000, the passphrase is erased from the pop proxy 910.

In another embodiment, the user passphrase, or private key may not be erased after logging-off the network 1000. In this embodiment, the user passphrase or private key remain on the computer so the user rarely has to retype their passphrase or download the encrypted private key 320 from the encryption server 105. The user passphrase or plain text private key, are never transmitted to the encryption server 105.

Figure 10:
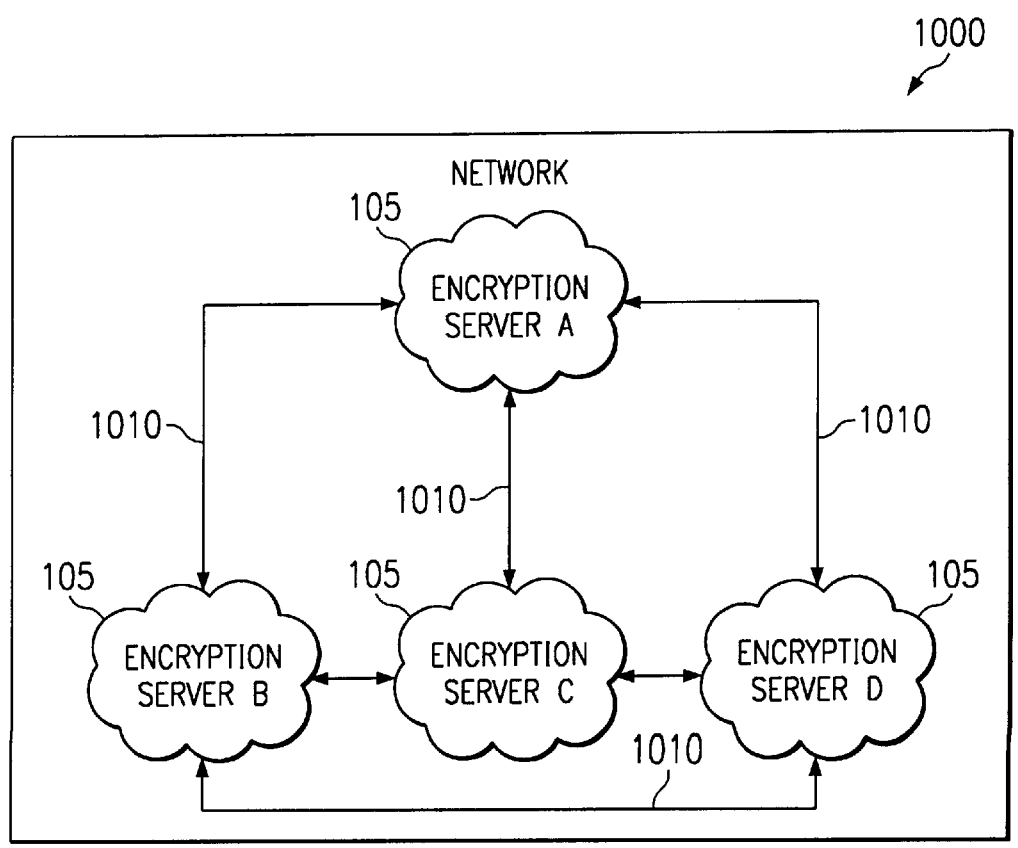
FIG. 10 shows a network comprising multiple encryption servers all connected to each other through communication channels.

FIG. 10 shows another embodiment of the public key cryptosystem with roaming user capability 200 where the network 1000 comprises multiple encryption servers 105 which all communicate with each other through communication channels 1010. An example of an encryption server 105 may be a Sun Workstation, or a low cost personal computer operating on a Unix system. contain all or a subset of every user's encrypted private key 320, public key 325, user identifier 330, or other user information. In this embodiment, the encryption server 105 administrator may have access to the private keys specific to each encryption server 105 on the network 1000.

Although the present invention has been described in detail, it should be understood that various changes, substitutions and alterations can be made hereto without departing from the spirit and scope of the invention as described by the appended claims.

What is claimed is:

1. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

retrieve a user recipient's public key;

encrypt a digital message with said user recipient's public key; and transmit said encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said network comprises a plurality of client computers and encryption servers, further wherein each encryption server can communicate with every other encryption server on said network.

2. The system of claim 1, wherein said client computer is further operable to store and access a New User computer program, said client computer processor operable to execute said New User computer program such that said client computer is directed by said New User computer program to communicate with said Server computer program to:

generate said public/private key pair;

generate said user passphrase;

generate said user identifier;

hash said user passphrase;

transmit said hash of said user passphrase to said encryption server to compare against a plurality of hashed English words, common nouns, and popular sayings located on said database of said encryption server;

encrypt said private key with said hash of said user passphrase yielding said encrypted private key; and transmit said encrypted private key and said public key to said encryption server.

3. The system of claim 1, wherein said user identifier is a user log-in ID or said user passphrase, and further wherein said user log-in ID or user passphrase is hashed and transmitted to said encryption server and compared against said database of hashed user identifiers to verify the identity of said user.

4. The system of claim 2, wherein said encryption server is further operable to execute said Server computer program to communicate with said New User computer program such that said encryption server is directed by said Server computer program to:

receive and compare said hash of said passphrase against a plurality of hashed English words, common nouns, and popular sayings located on said database of said encryption server;

compare said hash of said passphrase against said database of hashed passphrases to verify the identity of said user;

receive said encrypted private key and said public key paired to said encrypted private key from said client computer; and store said encrypted private key and said public key in said database of said encryption server.

5. The system of claim 1, wherein said Enabler computer program is further executable to transmit other user specific information from said client computer to said encryption server, said Server computer program is further executable to transmit other user specific information from said encryption server database to said client computer.

6. The system of claim 1, wherein said user may use any client computer on said network to access said encrypted private key, thus giving said user roaming capability.

7. The system of claim 1, wherein said user passphrase remains on said client computer for the duration of time said user is logged-in to said encryption server, further wherein said user passphrase is never transmitted to said encryption server and is erased from said client computer when said user logs-off said network.

8. The system of claim 1, wherein said user passphrase or private key may not be erased after logging-off said network, said user passphrase or said private key remain on said computer.

9. The system of claim 1, wherein said encrypted digital message resides on said encryption server and may not be accessed by anyone but an intended user recipient, further wherein said digital message may be in the form of email or real-time chat.

10. The system of claim 1, wherein a secure socket layer exists between said client sender computer and said encryption server, and wherein said secure socket layer also exists between said encryption server and said client recipient computer.

11. The system of claim 2, wherein said New User computer program and said Enabler computer program are downloaded from said encryption server or are directly installed on said client computer.

12. The system of claim 1, wherein said private key is symmetrically encrypted with said passphrase and stored on either said encryption server or said client computer.

13. The system of claim 1, wherein said encryption server allows a limited number of log-on attempts.

14. The system of claim 1, wherein said digital message is encrypted using any public/private key cipher including RSA, Elliptical Curve, or Diffie-Helman.

15. The system of claim 1, wherein said encrypted digital message is transmitted from said client sender computer to a server outside said network, then from said server outside said network to said client recipient computer.

16. The system of claim 1, wherein each encryption server on said network contains all or a subset of every user's encrypted private key, public key, user identifier, or other user information.

17. The system of claim 16, wherein each encryption server of said network has its own public/private key pair, further wherein each encryption server has access to said public/private key pairs of every other encryption server on said network.

18. The system of claim 17, wherein only an encryption server administrator has access to said private keys of each encryption server on said network.

19. The system of claim 1, wherein a cyclic redundancy check (CRC) is added to the end of said digital message before encrypting it.

20. The system of claim 1, wherein said encryption server includes a translator computer program to communicate with other public/private key encryption servers operating under a different standard certificate of authority.

21. The system of claim 1, wherein said public keys are stored on said encryption server in plain text form.

22. The system of claim 1, wherein said Server computer program and said New User computer program are divided into two or more subprograms.

23. The system of claim 1, wherein said user passphrase is generated by said New User computer program.

24. The system of claim 1, wherein said passphrase is actively or passively generated by true random numbers.

25. The system of claim 1, wherein said encryption server is authenticated to said user by industry standard means, such as SSL, using authentication certificates.

26. The system of claim 1, wherein said user may optionally sign said digital message with said private key before encrypting and transmitting said digital message to said encryption server.

27. The system of claim 1, wherein said digital message contains time or bandwidth sensitive data, and wherein said digital message need not be transmitted through said encryption server, and further wherein said time or bandwidth sensitive data is encrypted and transmitted directly to said client recipient computer.

28. The system of claim 1, wherein said passphrase, private key, or said user recipient's public is not erased after logging-off said network, and said passphrase, said private key, or said user recipient public key remains on said computer.

29. A method for sending an encrypted digital message from a client sender machine to a client recipient machine comprising the steps of:
at said client sender machine:
entering a user identifier; and
transmitting said user identifier to an encryption server;
at said encryption server:
receiving said user identifier;
comparing said user identifier against a plurality of user identifiers located in a database on said encryption server to verify the identity of said user;
retrieving a private key encrypted with a passphrase from said database of said encryption server, said private key having a corresponding public key, thereby forming a public/private key pair; and
transmitting said encrypted private key from said encryption server to said user's client machine;
at said client sender machine:
receiving said encrypted private key from said encryption server;
decrypting said encrypted private key with said passphrase;
generating a digital message;
retrieving a user recipient's public key from said encryption server database;
encrypting said digital message with said user recipient's public key; and
transmitting said encrypted digital message to said client recipient machine; and wherein said method employs a network comprised of a plurality of client computers and encryption servers, further wherein each encryption server can communicate with every other encryption server on said network.

30. The method of claim 29, further comprising the following steps prior to entering said user identifier,
at said client sender machine:
generating said public/private key pair;
generating said user passphrase;
generating said user identifier, wherein said identifier can be a user log-in ID;
hashing said user passphrase;
transmitting said hash of said user passphrase to said encryption server to compare against said database of hashed English words, common nouns, and popular sayings;
encrypting said private key with said hash of said user passphrase yielding said encrypted private key; and
transmitting said encrypted private key and said public key to said encryption server;
at said encryption server:
receiving said encrypted private key and said public key; and
storing said encrypted private key and said public key in said database of said encryption server.

31. The method of claim 29, wherein said user identifier is said user's passphrase, further wherein said user's passphrase is hashed and transmitted to said encryption server and compared against said database of hashed passphrases to verify the identity of said user.

32. The method of claim 29, wherein said encrypted digital message is transmitted from said client sender machine to said encryption server, then transmitted from said encryption server to said client recipient machine.

33. The method of claim 29, wherein said encrypted digital message is transmitted from said client sender machine to a server outside said network then from said server outside said network to said client recipient machine.

34. The method of claim 29, wherein said passphrase is actively or passively generated by true random numbers.

35. The method of claim 29, wherein said user may optionally sign said digital message with said private key before encrypting and transmitting said digital message to said encryption server.

36. A method for sending an encrypted digital message from a client sender machine to a client recipient machine comprising the steps of:
entering a user identifier; and
transmitting said user identifier to an encryption server to verify identity of said user; and
downloading an Enabler computer program from said encryption server to said client sender's machine, wherein said Enabler computer program is executable to communicate with a Server computer program located on said encryption server to:
allow said user to enter a user identifier;
transmit said user identifier to said encryption server to verify identity of said user;
receive a private key encrypted with a passphrase from a database located in a memory of said encryption server, said private key having a corresponding public key, thereby forming a public/private key pair;
use said passphrase to decrypt said encrypted private key at said client computer;
retrieve a user recipient's public key from said encryption server database;
encrypt a digital message with said user recipient's public key; and
transmit said encrypted digital message to said user recipient; and wherein said method employs a network comprised of a plurality of client computers and encryption servers, further wherein each encryption server can communicate with every other encryption server on said network.

37. The method of claim 36, wherein a New User computer program is downloaded from said encryption server to said client seder's machine, further wherein said New User computer program is executable to communicate with a Server computer program located on said encryption server to:
generate said public/private key pair;
generate said user passphrase;
generate said user identifier;
hash said user passphrase;
transmit said hash of said user passphrase to said encryption server to compare against a plurality of hashed English words, common nouns, and popular sayings located on said database of said encryption server;
encrypt said private key with said hash of said user passphrase yielding said encrypted private key; and
transmit said encrypted private key and public key to said encryption server.

38. The method of claim 36, wherein said user identifier is said user's passphrase, further wherein said user's passphrase is hashed and transmitted to said encryption server and compared against said database of hashed passphrases to verify the identity of said user.

39. The method of claim 36, wherein said New User computer program and said Enabler computer program are directly loaded onto said client sender's machine.

40. The method of claim 36, wherein logging into said encryption server comprises the steps of finding a log-in web page for said encryption server on the Internet and typing in a user's identifier.

41. The method of claim 36, wherein said encrypted digital message is transmitted from said client sender machine to said encryption server, then transmitted from said encryption server to said client recipient machine.

42. A system for sending an encrypted digital message from a user at a client sender computer to a client recipient computer over a network, comprising:
a client computer operable to access an Enabler computer program, said client computer comprising:
a client memory operable to store said Enabler computer program;
a client processor electrically connected to said client memory, said client processor operable to execute said Enabler computer program such that said client computer is directed by said Enabler computer program to communicate with a Server computer program located on said encryption server to:
allow said user to enter a user identifier;
transmit said user identifier to said encryption server to verify identity of said user;
receive a private key encrypted with a passphrase from a database located in a memory of said encryption server, said private key having a corresponding public key forming a public/private key pair;
use said passphrase to decrypt said encrypted private key at said client computer;
retrieve a user recipient's public key;
encrypt a digital message with said user recipient's public key; and
transmit said encrypted digital message to said user recipient;
an encryption server, said encryption server operable to process requests from said client computer, said encryption server comprising:
a server memory operable to store said Server computer program and a database, said database comprising a plurality of said user identifiers, encrypted private keys, and public keys; and
a server processor electronically connected to said server memory, said server processor operable to execute said Server computer program such that said encryption server is directed by said Server computer program to communicate with said Enabler computer program to:
receive and compare said user identifier against a plurality of user identifiers located in said database of said encryption server to verify identity of said user;
retrieve said encrypted private key from said encryption server database; and
transmit said encrypted private key from said encryption server to said user's client computer; and
a network comprising said client sender computer, said encryption server, and said client recipient computer, wherein said network allows communication between said client sender computer and said encryption server and further between said encryption server and said client recipient computer; and
wherein said user passphrase remains on said client server computer for the duration of time said user is logged-in to said encryption server,
further wherein said user passphrase is never transmitted to said encryption server and is erased from said client computer when said user logs-off said network.

43. A system for sending an encrypted digital message from a user at a client sender computer to a client recipient computer over a network, comprising:
a client computer operable to access an Enabler computer program, said client computer comprising:
a client memory operable to store said Enabler computer program;
a client processor electrically connected to said client memory, said client processor operable to execute said Enabler computer program such that said client computer is directed by said Enabler computer program to communicate with a Server computer program located on said encryption server to:
allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

retrieve a user recipient's public key;

encrypt a digital message with said user recipient's public key; and transmit said encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said user passphrase or private key may not be erased after logging-off said network.

44. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

retrieve a user recipient's public key;

encrypt a digital message with said user recipient's public key; and transmit said encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said encrypted digital message resides on said encryption server and may not be accessed by anyone but an intended user recipient.

45. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

retrieve a user recipient's public key;

encrypt a digital message with said user recipient's public key; and transmit said encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein a secure socket layer exists between said client sender computer and said encryption server, and wherein said secure socket layer also exists between said encryption server and said client recipient computer.

46. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

retrieve a user recipient's public key;

encrypt a digital message with said user recipient's public key; and transmit said encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said encryption server allows a limited number of log-on attempts.

47. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

retrieve a user recipient's public key;

encrypt a digital message with said user recipient's public key; and transmit said encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said encrypted digital message is transmitted from said client sender computer to a server outside said network, then from said server outside said network to said client recipient computer.

48. A system for sending an encrypted digital message from a user at a client sender computer to a client recipient computer over a network, comprising:

a client computer operable to access an Enabler computer program, said client computer comprising:
  a client memory operable to store said Enabler computer program;
  a client processor electrically connected to said client memory, said client processor operable to execute said Enabler computer program such that said client computer is directed by said Enabler computer program to communicate with a Server computer program located on said encryption server to:
    allow said user to enter a user identifier;
    transmit said user identifier to said encryption server to verify identity of said user;
    receive a private key encrypted with a passphrase from a database located in a memory of said encryption server, said private key having a corresponding public key forming a public/private key pair;
    use said passphrase to decrypt said encrypted private key at said client computer;
    retrieve a user recipient's public key;
    encrypt a digital message with said user recipient's public key; and
    transmit said encrypted digital message to said user recipient;

an encryption server, said encryption server operable to process requests from said client computer, said encryption server comprising:
  a server memory operable to store said Server computer program and a database, said database comprising a plurality of said user identifiers, encrypted private keys, and public keys; and
  a server processor electrically connected to said server memory, said server processor operable to execute said Server computer program such that said encryption server is directed by said Server computer program to communicate with said Enabler computer program to:
    receive and compare said user identifier against a plurality of user identifiers located in said database of said encryption server to verify identity of said user;
    retrieve said encrypted private key from said encryption server database; and
    transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein a cyclic redundancy check (CRC) is added to the end of said digital message before encrypting it.

49. A system for sending an encrypted digital message from a user at a client sender computer to a client recipient computer over a network, comprising:

a client computer operable to access an Enabler computer program, said client computer comprising:
  a client memory operable to store said Enabler computer program;
  a client processor electrically connected to said client memory, said client processor operable to execute said Enabler computer program such that said client computer is directed by said Enabler computer program to communicate with a Server computer program located on said encryption server to:
    allow said user to enter a user identifier;
    transmit said user identifier to said encryption server to verify identity of said user;
    receive a private key encrypted with a passphrase from a database located in a memory of said encryption server, said private key having a corresponding public key forming a public/private key pair;
    use said passphrase to decrypt said encrypted private key at said client computer;
    retrieve a user recipient's public key;
    encrypt a digital message with said user recipient's public key; and
    transmit said encrypted digital message to said user recipient;

an encryption server, said encryption server operable to process requests from said client computer, said encryption server comprising:
  a server memory operable to store said Server computer program and a database, said database comprising a plurality of said user identifiers, encrypted private keys, and public keys; and
  a server processor electrically connected to said server memory, said server processor operable to execute said Server computer program such that said encryption server is directed by said Server computer program to communicate with said Enabler computer program to:
    receive and compare said user identifier against a plurality of user identifiers located in said database of said encryption server to verify identity of said user;
    retrieve said encrypted private key from said encryption server database; and
    transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said encryption server is authenticated to said user by industry standard means, such as SSL, using authentication certificates.

50. A system for sending an encrypted digital message from a user at a client sender computer to a client recipient computer over a network, comprising:

a client computer operable to access an Enabler computer program, said client computer comprising:

a client memory operable to store said Enabler computer program;
a client processor electrically connected to said client memory, said client processor operable to execute said Enabler computer program such that said client computer is directed by said Enabler computer program to communicate with a Server computer program located on said encryption server to:
   allow said user to enter a user identifier;
   transmit said user identifier to said encryption server to verify identity of said user;
   receive a private key encrypted with a passphrase from a database located in a memory of said encryption server, said private key having a corresponding public key forming a public/private key pair;
   use said passphrase to decrypt said encrypted private key at said client computer;
   retrieve a user recipient's public key;
   encrypt a digital message with said user recipient's public key; and
   transmit said encrypted digital message to said user recipient;
an encryption server, said encryption server operable to process requests from said client computer, said encryption server comprising:
   a server memory operable to store said Server computer program and a database, said database comprising a plurality of said user identifiers, encrypted private keys, and public keys; and
   a server processor electrically connected to said server memory, said server processor operable to execute said Server computer program such that said encryption server is directed by said Server computer program to communicate with said Enabler computer program to:
      receive and compare said user identifier against a plurality of user identifiers located in said database of said encryption server to verify identity of said user;
      retrieve said encrypted private key from said encryption server database; and
      transmit said encrypted private key from said encryption server to said user's client computer; and
   a network comprising said client sender computer, said encryption server, and said client recipient computer, wherein said network allows communication between said client sender computer and said encryption server and further between said encryption server and said client recipient computer; and
   wherein said user may optionally sign said digital message with said private key before encrypting and transmitting said digital message to said encryption server.

51. A system for sending an encrypted digital message from a user at a client sender computer to a client recipient computer over a network, comprising:
a client computer operable to access an Enabler computer program, said client computer comprising:
   a client memory operable to store said Enabler computer program;
   a client processor electrically connected to said client memory, said client processor operable to execute said Enabler computer program such that said client computer is directed by said Enabler computer program to communicate with a Server computer program located on said encryption server to:
      allow said user to enter a user identifier;
      transmit said user identifier to said encryption server to verify identity of said user;
      receive a private key encrypted with a passphrase from a database located in a memory of said encryption server, said private key having a corresponding public key forming a public/private key pair;
      use said passphrase to decrypt said encrypted private key at said client computer;
      retrieve a user recipient's public key;
      encrypt a digital message with said user recipient's public key; and
      transmit said encrypted digital message to said user recipient;
an encryption server, said encryption server operable to process requests from said client computer, said encryption server comprising:
   a server memory operable to store said Server computer program and a database, said database comprising a plurality of said user identifiers, encrypted private keys, and public keys; and
   a server processor electronically connected to said server memory, said server processor operable to execute said Server computer program such that said encryption server is directed by said Server computer program to communicate with said Enabler computer program to:
      receive and compare said user identifier against a plurality of user identifiers located in said database of said encryption server to verify identity of said user;
      retrieve said encrypted private key from said encryption server database; and
      transmit said encrypted private key from said encryption server to said user's client computer; and
   a network comprising said client sender computer, said encryption server, and said client recipient computer, wherein said network allows communication between said client sender computer and said encryption server and further between said encryption server and said client recipient computer; and
   wherein said digital message contains time or bandwidth sensitive data, and wherein said digital message need not be transmitted through said encryption server, and further wherein said time or bandwidth sensitive data is encrypted and transmitted directly to said client recipient computer.

52. A system for sending an encrypted digital message from a user at a client sender computer to a client recipient computer over a network, comprising:
a client computer operable to access an Enabler computer program, said client computer comprising:
   a client memory operable to store said Enabler computer program;
   a client processor electrically connected to said client memory, said client processor operable to execute said Enabler computer program such that said client computer is directed by said Enabler computer program to communicate with a Server computer program located on said encryption server to:
      allow said user to enter a user identifier;
      transmit said user identifier to said encryption server to verify identity of said user;
      receive a private key encrypted with a passphrase from a database located in a memory of said encryption server, said private key having a corresponding public key forming a public/private key pair;
use said passphrase to decrypt said encrypted private key at said client computer;
retrieve a user recipient's public key;
encrypt a digital message with said user recipient's public key; and
transmit said encrypted digital message to said user recipient;
an encryption server, said encryption server operable to process requests from said client computer, said encryption server comprising:
a server memory operable to store said Server computer program and a database, said database comprising a plurality of said user identifiers, encrypted private keys, and public keys; and
a server processor electronically connected to said server memory, said server processor operable to execute said Server computer program such that said encryption server is directed by said Server computer program to communicate with said Enabler computer program to:
receive and compare said user identifier against a plurality of user identifiers located in said database of said encryption server to verify identity of said user;
retrieve said encrypted private key from said encryption server database; and
transmit said encrypted private key from said encryption server to said user's client computer; and
a network comprising said client sender computer, said encryption server, and said client recipient computer, wherein said network allows communication between said client sender computer and said encryption server and further between said encryption server and said client recipient computer; and
wherein said passphrase, private key, or said user recipient's public key is not erased after logging-off said network, and said passphrase, said private key, or said user recipient public key remains on said computer.

53. A method for sending an encrypted digital message from a client sender machine to a client recipient machine comprising the steps of:
at said client sender machine:
entering a user identifier; and
transmitting said user identifier to an encryption server;
at said encryption server:
receiving said user identifier;
comparing said user identifier against a plurality of user identifiers located in a database on said encryption server to verify the identity of said user;
retrieving a private key encrypted with a passphrase from said database of said encryption server, said private key having a corresponding public key, thereby forming a public/private key pair; and
transmitting said encrypted private key from said encryption server to said user's client machine;
at said client sender machine:
receiving said encrypted private key from said encryption server;
decrypting said encrypted private key with said passphrase:
generating a digital message;
retrieving a user recipient's public key from said encryption server database;
encrypting said digital message with said user recipient's public key; and
transmitting said encrypted digital message to said client recipient machine; and
wherein said user identifier is said user's passphrase, further wherein said user's passphrase is hashed and transmitted to said encryption server and compared against said database of hashed passphrases to verify the identity of said user.

54. A method for sending an encrypted digital message from a client sender machine to a client recipient machine comprising the steps of:
at said client sender machine:
entering a user identifier; and
transmitting said user identifier to an encryption server;
at said encryption server:
receiving said user identifier;
comparing said user identifier against a plurality of user identifiers located in a database on said encryption server to verify the identity of said user;
retrieving a private key encrypted with a passphrase from said database of said encryption server, said private key having a corresponding public key, thereby forming a public/private key pair; and
transmitting said encrypted private key from said encryption server to said user's client machine;
at said client sender machine;
receiving said encrypted private key from said encryption server;
decrypting said encrypted private key with said passphrase;
generating a digital message;
retrieving a user recipient's public key from said encryption server database;
encrypting said digital message with said user recipient's public key; and
transmitting said encrypted digital message to said client recipient machine; and
wherein said user encrypted digital message is transmitted from said client sender machine to said encryption server, then transmitted from said encryption server to said client recipient machine.

55. A method for sending an encrypted digital message from a client sender machine to a client recipient machine comprising the steps of:
at said client sender machine:
entering a user identifier; and
transmitting said user identifier to an encryption server;
at said encryption server;
receiving said user identifier;
comparing said user identifier against a plurality of user identifiers located in a database on said encryption server to verify the identity of said user;
retrieving a private key encrypted with a passphrase from said database of said encryption server, said private key having a corresponding public key, thereby forming a public/private key pair; and
transmitting said encrypted private key from said encryption server to said user's client machine;
at said client sender machine:
receiving said encrypted private key from said encryption server;
decrypting said encrypted private key with said passphrase;
generating a digital message;
retrieving a user recipient's public key from said encryption server database;

encrypting said digital message with said user recipient's public key; and transmitting said encrypted digital message to said client recipient machine; and wherein said encrypted digital message is transmitted from said client sender machine to a server outside said network then from said server outside said network to said client recipient machine.

56. A method for sending an encrypted digital message from a client sender machine to a client recipient machine comprising the steps of:

at said client sender machine:
entering a user identifier; and
transmitting said user identifier to an encryption server;

at said encryption server:
receiving said user identifier;
comparing said user identifier against a plurality of user identifiers located in a database on said encryption server to verify the identity of said user;
retrieving a private key encrypted with a passphrase from said database of said encryption server, said private key having a corresponding public key, thereby forming a public/private key pair; and
transmitting said encrypted private key from said encryption server to said user's client machine;

at said client sender machine:
receiving said encrypted private key from said encryption server;
decrypting said encrypted private key with said passphrase;
generating a digital message;
retrieving a user recipient's public key from said encryption server database;
encrypting said digital message with said user recipient's public key; and
transmitting said encrypted digital message to said client recipient machine; and
wherein said user may optionally sign said digital message with said private key before encrypting and transmitting said digital message to said encryption server.

57. A method for sending an encrypted digital message from a client sender machine to a client recipient machine comprising the steps of:

entering a user identifier; and transmitting said user identifier to an encryption server to verify identity of said user; and downloading an Enabler computer program from said encryption server to said client sender's machine, wherein said Enabler computer program is executable to communicate with a Server computer program located on said encryption server to:

allow said user to enter a user identifier;
transmit said user identifier to said encryption server to verify identity of said user;
receive a private key encrypted with a passphrase from a database located in a memory of said encryption server, said private key having a corresponding public key, thereby forming a public/private key pair;
use said passphrase to decrypt said encrypted private key at said client computer;
retrieve a user recipient's public key from said encryption server database;
encrypt a digital message with said user recipient's public key; and transmit said encrypted digital message to said user recipient; and wherein a New User computer program is downloaded from said encryption server to said client sender's machine, further wherein said New User computer program is executable to communicate with a Server computer program located on said encryption server to:

generate said public/private key pair;
generate said user passphrase;
generate said user identifier;
hash said user passphrase;
transmit said hash of said user passphrase to said encryption server to compare against a plurality of hashed English words, common nouns, and popular sayings located on said database of said encryption server;
encrypt said private key with said hash of said user passphrase yielding said encrypted private key; and
transmit said encrypted private key and public key to said encryption server.

58. A method for sending an encrypted digital message from a client sender machine to a client recipient machine comprising the steps of:

entering a user identifier; and transmitting said user identifier to an encryption server to verify identity of said user; and downloading an Enabler computer program from said encryption server to said client sender's machine, wherein said Enabler computer program is executable to communicate with a Server computer program located on said encryption server to:

allow said user to enter a user identifier;
transmit said user identifier to said encryption server to verify identity of said user;
receive a private key encrypted with a passphrase from a database located in a memory of said encryption server, said private key having a corresponding public key, thereby forming a public/private key pair;
use said passphrase to decrypt said encrypted private key at said client computer;
retrieve a user recipient's public key from said encryption server database;
encrypt a digital message with said user recipient's public key; and
transmit said encrypted digital message to said user recipient; and
wherein said New User computer program and said Enabler computer program are directly loaded onto said client sender's machine.

59. A method for sending an encrypted digital message from a client sender machine to a client recipient machine comprising the steps of:

entering a user identifier; and transmitting said user identifier to an encryption server to verify identity of said user; and downloading an Enabler computer program from said encryption server to said client sender's machine, wherein said Enabler computer program is executable to communicate with a Server computer program located on said encryption server to:

allow said user to enter a user identifier;
transmit said user identifier to said encryption server to verify identity of said user;

receive a private key encrypted with a passphrase from a database located in a memory of said encryption server, said private key having a corresponding public key, thereby forming a public/private key pair;

use said passphrase to decrypt said encrypted private key at said client computer;

retrieve a user recipient's public key from said encryption server database;

encrypt a digital message with said user recipient's public key; and transmit said encrypted digital message to said user recipient; and wherein said encrypted digital message is transmitted from said client sender machine to said encryption server, then transmitted from said encryption server to said client recipient machine.

* * * * *

US006154543C1

(12) EX PARTE REEXAMINATION CERTIFICATE (4927th)
United States Patent
Baltzley

(10) Number: US 6,154,543 C1
(45) Certificate Issued: Apr. 13, 2004

(54) PUBLIC KEY CRYPTOSYSTEM WITH ROAMING USER CAPABILITY

(75) Inventor: Cliff A. Baltzley, Austin, TX (US)

(73) Assignee: Hush Communication Corporation, The Valley (AI)

Reexamination Request:
No. 90/006,304, Jun. 3, 2002

Reexamination Certificate for:
Patent No.: 6,154,543
Issued: Nov. 28, 2000
Appl. No.: 09/200,640
Filed: Nov. 25, 1998

(51) Int. Cl.[7] ................................................ G09C 3/08
(52) U.S. Cl. ..................... 380/255; 380/259; 705/74; 713/150; 713/201
(58) Field of Search ............................. 713/200, 201, 713/168, 181

(56) References Cited

U.S. PATENT DOCUMENTS

| | | | |
|---|---|---|---|
| 5,224,163 A | 6/1993 | Gasser et al. ................. | 380/30 |
| 5,226,079 A | 7/1993 | Holloway ..................... | 380/25 |
| 5,619,574 A | 4/1997 | Johnson et al. ............... | 380/25 |
| 5,671,279 A | 9/1997 | Elgamal ....................... | 380/23 |
| 5,757,916 A | 5/1998 | MacDoran et al. ........... | 380/25 |
| 5,903,652 A | 5/1999 | Mital ........................... | 380/25 |
| 5,987,440 A | 11/1999 | O'Neil et al. ................. | 705/44 |
| 6,151,676 A | * 11/2000 | Cuccia et al. ................ | 713/176 |
| 6,263,446 B1 | * 7/2001 | Kausik et al. ............... | 713/201 |

OTHER PUBLICATIONS

Myers et al., "Post Office Protocol—Version 3", RFC 1939, May 1996.
Password Usage, FIPS PUB 112, May 30, 1985.
Atkins et al., "PGP Message Exchange Formats", RFC 1991, Aug. 1996.
Postel, "Simple Mail Transfer Protocol", RFC 821, Aug. 1982.

* cited by examiner

Primary Examiner—Matthew Smithers

(57) ABSTRACT

A public key cryptosystem with roaming user capability within a network that allows secure communication between users of the system, client machines, and encryption servers. A client machine generates and stores an encrypted private key on an encryption server. A user may then access the encrypted private key from any client machine located on the network and decrypt it using a passphrase, thus giving the user roaming capability. The private key may then be used to decrypt any encrypted messages received. A user can generate a digital message, encrypt it with a client recipient's public key, and transmit it to the encryption server from any client machine on the network.

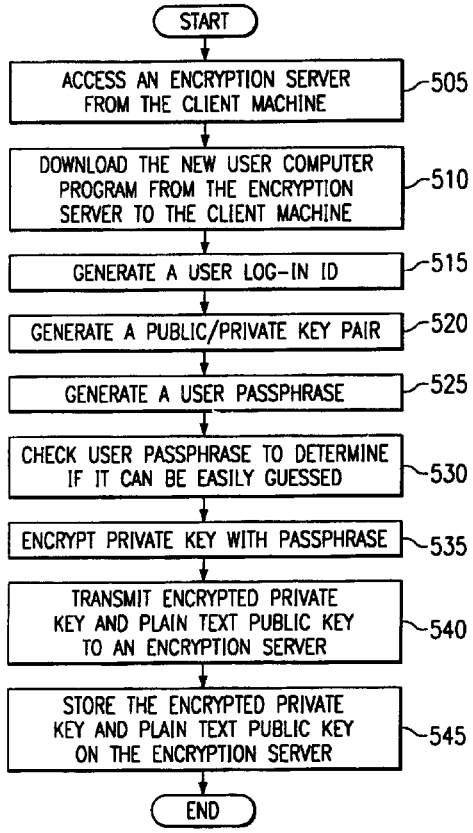

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 48 and 52 is confirmed.

Claims 1, 9, 14, 15, 19, 26, 27, 29, 32, 33, 35, 36, 41–47, 49–51 and 53–59 are determined to be patentable as amended.

Claims 2–8, 10–13, 16–18, 20–25, 28, 30, 31, 34 and 37–40, dependent on an amended claim, are determined to be patentable.

1. A system for sending an encrypted digital message from a user at a client sender computer to a client recipient computer over a network, comprising:
    a client computer operable to access an Enabler computer program, said client computer comprising:
        a client memory operable to store said Enabler computer program;
        a client processor electrically connected to said client memory, said client processor operable to execute said Enabler computer program such that said client computer is directed by said Enabler computer program to communicate with a Server computer program located on said encryption server to:
            allow said user to enter a user identifier;
            transmit said user identifier to said encryption server to verify identity of said user;
            receive a private key encrypted with a passphrase from database located in a memory of said encryption server, said private key having a corresponding public key forming a public/private key pair;
            use said passphrase to decrypt said encrypted private key at said client computer;
            *receive a first encrypted digital message from another user encrypted using a corresponding to said private key;*
            *decrypt the first encrypted digital message to a first digital message using said private key;*
            retrieve a user recipient's public key;
            encrypt a *second* digital message with said user recipient's public key *to create a second encrypted digital message*; and
            transmit said *second* encrypted digital message to said user recipient;
    an encryption server, said encryption server operable to process requests from said client computer, said encryption server comprising:
        a server memory operable to store said Server computer program and a database, said database comprising a plurality of said user identifiers, encrypted private keys, and public keys; and
        a server processor electrically connected to said server memory, said server processor operable to execute said Server computer program such that said encryption server is directed by said Server computer program to communicate with said Enabler computer program to:
            receive and compare said user identifier against a plurality of user identifiers located in said database of said encryption server to verify identity of said user;
            retrieve said encrypted private key from said encryption server database; and
            transmit said encrypted private key from said encryption server to said user's client computer; and
    a network comprising said client sender computer, said encryption server, and said client recipient computer, wherein said network allows communication between said client sender computer and said encryption server and further between said encryption server and said client recipient computer; and wherein said network comprises a plurality of client computers and encryption servers, further wherein each encryption server can communicate with every other encryption server on said network; *and*
    *wherein said public key corresponding to said private key is downloaded from said encryption server by said another user.*

9. The system of claim 1, wherein said *second* encrypted digital message resides on said encryption server and may not be accessed by anyone but an intended user recipient, further wherein said *second* digital message may be in the form of email or real-time chat, *further wherein said first digital message may be in the form of email or real-time chat*.

14. The system of claim 1, wherein said *first* digital message [is] *and said second digital message are* encrypted using any public/private key cipher including RSA, Elliptical Curve, or Diffie-Helman.

15. The system of claim 1, wherein said *second* encrypted digital message is transmitted from said client sender computer to a server outside said network, then from said server outside said network to said client recipient computer.

19. The system of claim 1, wherein a cyclic redundancy check (CRC) is added to the end of said *second* digital message before encrypting it.

26. The system of claim 1, wherein said user may optionally sign said *second* digital message with said private key before encrypting and transmitting said digital message to said encryption server.

27. The system of claim 1, wherein said *second* digital message contains time or bandwidth sensitive data, and wherein said digital message need not be transmitted through said encryption server, and further wherein said time or bandwidth sensitive data is encrypted and transmitted directly to said client recipient computer.

29. A method for sending an encrypted digital message from a *user at a* client sender machine to a client recipient machine comprising the steps of:
    at said client sender machine:
        entering a user identifier; and
        transmitting said user identifier to an encryption server;
    at said encryption server:
        receiving said user identifier;
        comparing said user identifier against a plurality of user identifiers located in a database on said encryption server to verify the identity of said user;
        retrieving a private key encrypted with a passphrase from said database of said encryption server, said private key having a corresponding public key, thereby forming a public/private key pair; and transmitting said encrypted private key from said encryption server to said user's client machine;

at said client sender machine:

receiving said encrypted private key from said encryption server;

decrypting said encrypted private key with said passphrase;

*receiving a first encrypted digital message from another user encrypted using a public key corresponding to said private key;*

*decrypting the first encrypted digital message to create a first digital message using said private key;* generating a *second* digital message;

retrieving a user recipient's public key from said encryption server database;

encrypting said *second* digital message with said user recipient's public key; and transmitting said *second* encrypted digital message to said client recipient machine; and wherein said method employs a network comprised of a plurality of client computers and encryption servers, further wherein each encryption server can communicate with every other encryption server on said network*; and*

*wherein said public key corresponding to said private key is downloaded from said encryption server by said another user.*

32. The method of claim 29, wherein said *second* encrypted digital message is transmitted from said client sender machine to said encryption server, then transmitted from said encryption server to said client recipient machine.

33. The method of claim 29, wherein said *second* encrypted digital message is transmitted from said client sender machine to a server outside said network then from said server outside said network to said client recipient machine.

35. The method of claim 29, wherein said user may optionally sign said *second* digital message with said private key before encrypting and transmitting said *second* digital message to said encryption server.

36. A method for sending an encrypted digital message from a client sender machine to a client recipient machine comprising the steps of:

entering a user identifier; and transmitting said user identifier to an encryption server to verify identity of said user; and downloading an Enabler computer program from said encryption server to said client sender's machine, wherein said Enabler computer program is executable to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key, thereby forming a public/private key pair;

use said passphrase to decrypt said encrypted private key at said client computer;

*receive a first encrypted digital message from another user encrypted using a public key corresponding to said private key;*

*decrypt the first encrypted digital message to create a first digital message using said private key;*

*generate a second digital message;*

*retrieve a user recipient's public key from said encryption server database;* encrypt [a] *the second* digital message with said user recipient's public key *to create a second encrypted digital message*; and transmit said *second* encrypted digital message to said user recipient; and wherein said method employs a network comprised of a plurality of client computers and encryption servers, further wherein each encryption server can communicate with every other encryption server on said network*; and*

*wherein said public key corresponding to said private key is downloaded from said encryption server by said another user.*

41. The method of claim 36, wherein said *second* encrypted digital message is transmitted from said client sender machine to said encryption server, then transmitted from said encryption server to said client recipient machine.

42. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

user said passphrase to decrypt said encrypted private key at said client computer;

*receive a first encrypted digital message from another user encrypted using a public key corresponding to said private key;*

*decrypt the first encrypted digital message to create a first digital message using said private key;*

*generate a second digital message;* retrieve a user recipient's public key;

encrypt [a] *the second* digital message with said user recipient's public key *to create a second encrypted digital message*; and transmit said *second* encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said user passphrase remains on said client server computer for the duration of time said user is logged-in to said encryption server, further wherein said user passphrase is never transmitted to said encryption server and is erased from said client computer when said user logs-off said network;

*wherein said public key corresponding to said private key is downloaded from said encryption server by said another user.*

43. A system for sending an encrypted digital message from a user at a client sender computer to a client recipient computer over a network, comprising:

a client computer operable to access an Enabler computer program, said client computer comprising:

a client memory operable to store said Enable computer program;

a client processor electrically connected to said client memory, said client processor operable to execute said Enable computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encrytion server, said private key having a corresponding public key forming a public/private key pair;

use said passphrase to decrypt said encrypted private key at said client computer;

*receive a first encrypted digital message from another user encrypted using a public key corresponding to said private key;*

*decrypt the first encrypted digital message to create a first digital message using said private key;*

*generate a second digital message;* retrieve a user recipient's public key;

encrypt [a] *the second* digital message with said user recipient's public key *to create a second encrypted digital message*; and transmit said *second* encrypted digital message to said user recipient an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality or user identifiers located in said database of said encryption server to verify identify of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said user passphrase or private key may not be erased after logging-off said network,

*wherein said public key corresponding to said private key is downloaded from said encryption server by said another user.*

44. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key froming a public/private key pair;

use said passphrase to decrypt said encrypted private key at said client computer;

*receive a first encrypted digital message from another user encrypted using a public key corresponding to said private key;*

*decrypt the first encrypted digital message to a create first digital message using said private key;*

*generate a second digital message;* retrieve a user recipient's public key;

encrypt [a] *the second* digital message with said user recipient's public key *to create a second encrypted digital message*; and transmit said *second* encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicates with said Enabler computer program to:
    receive and compare said user identifier against a plurality against a plurality of user identifiers located in said database of said encryption server to verify identity of said user;
    retrieve said encrypted private key from said encryption server database; and
    transmit said encrypted private key from said encryption server to said user's client computer; and
a network comprising said client sender computer, said encryption server, and said client recipient computer, wherein said network allows communication between said client sender computer and said encryption server and further between said encryption server and said client recipient computer; and
wherein said encrypted digital message resides on said encryption server and may not be accessed by anyone but an intended user recipient, *and*
*wherein said public key corresponding to said private key is downloaded from said encryption server by said another user.*

45. A system for sending an encrypted digital message for a user at a client sender computer to a client recipient computer over a network, comprising:
a client computer operable to access an Enabler computer program, said client computer comprising:
    a client memory operable to store said Enable computer program;
    a client processor electrically connected to said client memory, said client processor operable to execute said Enabler computer program such that said client computer is directed by said Enabler computer program to communicate with a Server computer program located on said encryption server to:
    allow said user to enter a user identifier;
    transmit said user identifier to said encryption server to verify identity of said user;
    receive a private key encrypted with a passphrase from a database located in a memory of said encryption server, said private key having a corresponding public key forming a public/private key pair;
    use said passphrase to decrypt said encrypted private key at said client computer;
    *receive a first encrypted digital message from another user encrypted using a public key corresponding to said private key;*
    *decrypt the first encrypted digital message to a create first digital message using said private key;*
    generate a second digital message;
    retrieve a user recipient's public key;
    encrypt [a] *the second* digital message with said user recipient's public key *to create a second encryted digital message*; and
    transmit said *second* encrypted digital message to said user recipient;
an encryption server, said encryption server operable to process requests from said client computer, said encryption server comprising:
    a server memory operable to store said Server computer program and a database, said database comprising a plurality of said user identifiers, encrypted private keys, and public keys; and
    a server processor electronically connected to said server memory, said server processor operable to execute said Server computer program such that said encryption server is directed by said Server computer program to communicate with said Enabler computer program to:
    receive and compare said user identifier against a plurality of user identifiers located in said database of said encryption server to verify identity of said user;
    retrieve said encrypted private key from said encryption server database; and
    transmit said encrypted private key from said encryption server to said user's client computer; and
a network comprising said client sender computer, said encryption server, and said client recipient computer, wherein said network allows communication between said client sender computer and said encryption server and further between said encryption server and said client recipient computer; and wherein a secure socket layer exists between said client sender computer and said encryption server, and
wherein said secure socket layer also exists between said encryption server and said client recipient computer, *and*
*wherein said public key corresponding to said private key is downloaded from said encryption server by said another user.*

46. A system for sending an encrypted digital message from a user at a client sender computer to a client recipient computer over a network, comprising:
a client computer operable to access an Enabler computer program, said client computer comprising:
    a client memory operable to store said Enabler computer program;
    a client processor electrically connected to said client memory, said client processor operable to execute said Enabler computer program such that said client computer is directed by said Enabler computer program to communicate with a Server computer program located on said encryption server to:
    allow said user to enter a user identifier;
    transmit said user identifier to said encryption server to verify identity of said user;
    receive a private key encrypted with a passphrase from a database located in a memory of said encryption server, said private key having a corresponding public key forming a public/private key pair;
    use said passphrase to decrypt said encrypted private key at said client computer;
    *receive a first encrypted digital message encrypted using a public key corresponding to said private key;*
    *decrypt the first encrypted digital message from another user to a first digital message using said private key;*
    generate a second digital message;
    retrieve a user recipient's public key;
    encrypt [a] *the second* digital message with said user recipient's public key *to create a second encrypted digital message*; and
    transmit said *second* encrypted digital message to said user recipient;

an encryption server, said encryption server operable to process requests from said client computer, said encryption server comprising:
   a server memory operable to store said Server computer program and a database, said database comprising a plurality of said user identifiers, encrypted private keys, and public keys; and
   a server processor electronically connected to said server memory, said server processor operable to execute said Server computer program such that said encryption server is directed by said Server computer program to communicate with said Enabler computer program to:
      receive and compare said user identifier against a plurality of user identifiers located in said database of said encryption server to verify identity of said user;
      retrieve said encrypted private key from said encryption server database; and
      transmit said encrypted private key from said encryption server to said user's client computer; and
   a network comprising said client sender computer, said encryption server, and said client recipient computer, wherein said network allows communication between said client sender computer and said encryption server and further between said encryption server and said client reciepient computer; and
   wherein said encryption server allows a limited number of log-on attempts, *and*
   *wherein said public key corresponding to said private key is downloaded from said encryption server by said another user.*

47. A system for sending an encrypted digital message from a user at a client sender computer to a client recipient computer over a network, comprising:
   a client computer operable to access an Enabler computer program, said client computer comprising:
      a client memory operable to store and said Enabler computer program;
      a client processor electrically connected to said client memory, said client processor operable to execute said Enabler computer program such that said client computer is directed by said Enabler computer program to communicate with a Server computer program located on said encryption server to:
         allow said user to enter a user identifer;
         transmit said user identifier to said encryption server to verify identity of said user;
         receive a private key encrypted with a passphrase from a database located in a memory of said encryption server, said private key having a corresponding public key forming a public/private key pair;
         use said passphrase to decrypt said encrypted private key at said client computer;
         *receive a first encrypted digital message from another user encrypted using a public key corresponding to said private key;*
         *decrypt the first encrypted digital message to create a first digital message using said private key;*
         generate a second digital message;
         retrieve a user recipient's public key;
         encrypt [a] *the second* digital message with said user recipient's public key *to create a second encrypted digital message*; and
         transmit said *second* encrypted digital message to said user recipient;

an encryption server, said encryption server operable to process requests from said client computer, said encryption server comprising:
   a server memory operable to store said Server computer program and a database, said database comprising a plurality of said user identifiers, encrypted private keys, and public keys; and
   a server processor electronically connected to said server memory, said server processor operable to execute said Server computer program such that said encryption server is directed by said Server computer program to communicate with said Enabler computer program to:
      receive and compare said user identifier against a plurality of user identifiers located in said database of said encryption server to verify identity of said user;
      retrieve said encrypted private key from said encryption server database; and
      transmit said encrypted private key from said encryption server to said user's client computer; and
   a network comprising said client sender computer, said encryption server, and said client recipient computer, wherein said network allows communication between said client sender computer and said encryption server and further between said encryption server and said client recipient computer; and
   wherein said *second* encrypted digital message is transmitted from said client sender computer to a server outside said network, then from said server outside said network to said client recipient computer, *and*
   *wherein said public key corresponding to said private key is downloaded from said encryption server by said another user.*

49. A system for sending an encrypted digital message from a user at a client sender computer to a client recipient computer over a network, comprising:
   a client computer operable to access an Enabler computer program, said client computer comprising:
      a client memory operable to store said Enabler computer program;
      a client processor electrically connected to said client memory, said client processor operable to execute said Enabler computer program such that said client computer is directed by said Enabler computer program to communicate with a Server computer program located on said encryption server to:
         allow said user to enter a user identifier;
         transmit said user identifier to said encryption server to verify identity of said user;
         receive a private key encrypted with a passphrase from database located in a memory of said encryption server, said private key having a corresponding public key forming a public/private key pair;
         use said passphrase to decrypt said encrypted private key at said client computer;
         *receive a first encrypted digital message from another user encrypted using a public key corresponding to said private key;*
         *decrypt the first encrypted digital message to create a first digital message using said private key;*
         generate a second digital message;
         retrieve a user recipient's public key;
         encrypt [a] *the second* digital message with said user recipient's public key *to create a second encrypted digital message*; and transmit said *second* encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server momory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said encryption server is authenticated to said user by industry standard means, such as SSL, using authentication certificates, *and*

*wherein said public key corresponding to said private key is downloaded from said encryption server by said another user.*

50. A system for sendling an encrypted digital message from a user at a client sender computer to a client recipient computer over a network, comprising:

a client computer operable to access an Enables computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

receive a first encrypted digital message from another user encrypted using a public key corresponding to said private key;

decrypt the first encrypted digital message to create a first digital message using said private key;

generate a second digital message;

retrieve a user recipient's public key;

encrypt [a] *the second* digital message with said user recipient's public key *to create a second encrypted digital message*; and transmit said *second* encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurally of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer, and wherein said user may optionally sign said *second* digital message with said private key before encrypting and transmitting said digital message to said encryption server, *and*

*wherein said public key correspnding to said private key is downloaded from said encryption server by said another user.*

51. A system for sending an encrypted digital message from a user at a client sender computer to a client recipient computer over a network, comprising:

a client computer operable to access an Enabler computer program, said client computer comprising:

a client memory operable to store said Enabler computer program;

a client processor electrically connected to said client memory, said client processor operable to execute said Enabler computer program such that said client computer is directed by said Enabler computer program to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key forming a public/private key pair;

use said passphrase to decrypt said encrypted private key at said client computer;

receive a first encrypted digital message from another user encrypted using a public key corresponding to said private key;

decrypt the first encrypted digital message to create a first digital message using said private key;

generate a second digital message;

retrieve a user recipient's public key;

encrypt [a] *the second* digital message with said user recipient's public key *to create a second encrypted digital message*; and transmit said *second* encrypted digital message to said user recipient;

an encryption server, said encryption server operable to process requests from said client computer, said encryption server comprising:

a server memory operable to store said Server computer program and a database, said database comprising a plurality of said user identifiers, encrypted private keys, and public keys; and a server processor electronically connected to said server memory, said server processor operable to execute said Server computer program such that said encryption server is directed by said Server computer program to communicate with said Enabler computer program to:

receive and compare said user identifier against a plurality of user identifiers located in said database of said encryption server to verify identity of said user;

retrieve said encrypted private key from said encryption server database; and transmit said encrypted private key from said encryption server to said user's client computer; and a network comprising said client sender computer, said encryption server, and said client recipient computer, wherein said network allows communication between said client sender computer and said encryption server and further between said encryption server and said client recipient computer; and wherein said *second* digital message contains time or bandwidth sensitive data, and wherein said *second* digital message need not be transmitted through said encryption server, and further wherein said time or bandwidth sensitive data is encrypted and transmitted directly to said client recipient computer, *and wherein said public key corresponding to said private key is downloaded from said encryption server by said another user.*

53. A method for sending an encrypted digital message from a client sender machine to a client recipient machine comprising the steps of:

at said client sender machine:
entering a user identifier; and
transmitting said user identifier to an encryption server;

at said encryption server:
receiving said user identifier;
comparing said user identifier against a plurality of user identifiers located in a database on said encryption server to verify the identity of said user;
retrieving a private key encrypted with a passphrase from said database of said encryption server, said private key having a corresponding public key, thereby forming a public/private key pair; and
transmitting said encrypted private key from siad encryption server to said user's client machine;

at said client sender machine:
receiving said encrypted private key from said encryption server;
decrypting said encrypted private key with said passphrase:
receiving a first encrypted digital message from another user encrypted using a public key corresponding to said private key;

*decrypting the first encrypted digital message to create a first digital message using said private key;*
generating a *second* digital message;
retrieving a user recipient's public key from said encryption server database;
encrypting said *second* digital message with said user recipient's public key *to create a second encrypted digital message*; and
transmitting said *second* encrypted digital message to said client recipient machine; and
wherein said user identifier is said user's passphrase, further wherein said user's passphrase is hashed and transmitted to said encryption server and compared against said database of hashed passphrases to verify the identity of said user, *and*
*wherein said public key corresponding to said private key is downloaded from said encryption server by said another user.*

54. A method for sending an encrypted digital message from a client sender machine to a client recipient machine comprising the steps of:

at said client sender machine:
entering a user identifier; and
transmitting said user identifier to an encryption server;

at said encryption server:
receiving said user identifier;
comparing said user identifier against a plurality of user identifiers located in a database on said encryption server to verify the identity of said user;
retrieving a private key encrypted with a passphrase from siad database of said encryption server, said private key having a corresponding public key, thereby forming a public/private key pair; and
transmitting said encrypted private key from said encryption server to said user's client machine;

at said client sender machine;
receiving said encrypted private key from said encryption server;
decrypting said encrypted private key with said passphrase;
receiving a first encrypted digital message from another user encrypted using a public key corresponding to said private key;
decrypting the first encrypted digital message to create a first digital message using said private key;
generating a *second* digital message;
retrieving a user recipient's public key from said encryption server database;
encrypting said *second* digital message with said user recipient's public key *to create a second encrypted digital message*; and
transmitting said *second* encrypted digital message to said client recipient machine; and
*wherein said* [user] *second* encrypted digital message is transmitted from said client sender machine to said encryption server, then transmitted from said encryption server to said client recipient machine, *and*
*wherein said public key corresponding to said private key is downloaded from said encryption server by said another user.*

55. A method for sending an encrypted digital message from a client sender machine to a client recipient machine comprising the steps of:
- at said client sender machine:
  - entering a user identifier; and
  - transmitting said user identifier to an encryption server;
- at said encryption server;
  - receiving said user identifier;
  - comparing said user identifier against a plurality of user identifiers located in a database on said encryption server to verify the identity of said user;
  - retrieving a private key encrypted with a passphrase from said database of said encryption server, said private key having a corresponding public key, thereby forming a public/private key pair; and
  - transmitting said encrypted private key from said encryption server to said user's client machine;
- at said client sender machine:
  - receiving said encrypted private key from said encryption server;
  - decrypting said encrypted private key with said passphrase;
  - generating a digital message;
  - *receiving a first encrypted digital message from another user encrypted using a public key corresponding to said private key;*
  - *decrypting the first encrypted digital message to create a first digital message using said private key;*
  - generating a *second* digital message;
  - retrieving a user recipient's public key from said encryption server database;
  - encrypting said *second* digital message with said user recipient's public key *to create a second encrypted digital message*; and
  - transmitting said *second* encrypted digital message to said client recipient machine; and
  - wherein said *second* encrypted digital message is transmitted from said client sender machine to a server outsider said network then from said server outside said network to said client recipient machine, *and*
  - *wherein said public key corresponding to said private key is downloaded from said encryption server by said another user.*

56. A method for sending an encrypted digital message from a client sender machine to a client recipient machine comprising the steps of:
- at said client sender machine:
  - entering a user identifier; and
  - transmitting said user identifier to an encryption server;
- at said encryption server:
  - receiving said user identifier;
  - comparing said user identifier against a plurality of user identifiers located in a database on said encryption server to verify the identity of said user;
  - retrieving a private key encrypted with a passphrase from said database of said encryption server, said private key having a corresponding public key, thereby forming a public/private key pair; and
  - transmitting said encrypted private key from said encryption server to said user's client machine;
- at said client sender machine:
  - receiving said encrypted private key from said encryption server;
  - decrypting said encrypted private key with said passphrase;
  - *receiving a first encrypted digital message from another user encrypted using a public key corresponding to said private key;*
  - *decrypting the first encrypted digital message to create a first digital message using said private key;*
  - generating a *second* digital message;
  - retrieving a user recipient's public key from said encryption server database;
  - encrypting said *second* digital message with said user recipient's public key *to create a second encrypted digital message*; and
  - transmitting said *second* encrypted digital message to said client recipient machine; and
  - wherein said user may optionally sign said *second* digital message with said private key before encrypting and transmitting said digital message to said encryption server, *and*
  - *wherein said public key corresponding to said private key is downloaded from said encryption server by said another user.*

57. A method for sending an encrypted digital message from a client sender machine to a client recipient machine comprising the steps of:
- entering a user identifier; and
- transmitting said user identifier to an encryption server to verify identity of said user; and
- downloading an Enabler computer program from said encryption server to said client sender's machine, wherein said Enabler computer program is executable to communicate with a Server computer program located on said encryption server to:
- allow said user to enter a user identifier;
- transmit said user identifier to said encryption server to verify identity of said user;
- receive a private key encrypted with a passphrase from a database located in a memory of said encryption server, said private key having a corresponding public key, thereby forming a public/private key pair;
- use said passphrase to decrypt said encrypted private key at said client computer;
- *receive a first encrypted digital message from another user encrypted using a public key corresponding to said private key;*
- *decrypt the first encrypted digital message to create a first digital message using said private key;*
- generate a second digital message;
- retrieve a user recipient's public key from said encryption server database;
- encrypt [a] *the second* digital message with said user recipient's public key *to create a second encrypted digital message*; and
- transmit said *second* encrypted digital message to said user recipient; and
- wherein a New User computer program is downloaded from said encryption server to said client sender's machine, further wherein said New User computer program is executable to communicate with a Server computer program located on said encryption server to:
- generate said public/private key pair;
- generate said user passphrase;
- generate said user identifier;
- hash said user passphrase;
- transmit said hash of said user passphrase to said encryption server to compare against a plurality of hashed English words, common nouns, and popular sayings located on said database of said encryption server;
- encrypt said private key with said hash of said user passphrase yielding said encrypted private key; and transmit said encrypted private key and public key to said encryption server, *and*

*wherein said public key corresponding to said private key is downloaded from said encryption server by said another user.*

58. A method for sending an encrypted digital message from a client sender machine to a client recipient machine comprising the steps of:

entering a user identifier; and transmitting said user identifier to an encryption server to verify identity of said user; and downloading an Enabler computer program from said encryption server to said client sender's machine, wherein said Enabler computer program is executable to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key, thereby forming a public/private key pair;

use said passphrase to decrypt said encrypted private key at said client computer;

*receive a first encrypted digital message from another user encrypted using a public key corresponding to said private key;* decrypt the first encrypted digital message to create a first digital message using said private key;

*generate a second digital message;* retrieve a user recipient's public key from said encryption server database;

encrypt [a] *the second* digital message with said user recipient's public key *to create a second encrypted digital message*; and transmit said *second* encrypted digital message to said user recipient; and wherein said New User computer program and said Enabler computer program are directly loaded onto said client sender's machine, *and*

*wherein said public key corresponding to said private key is downloaded from said encryption server by said another user.*

59. A method for sending an encrypted digital message from a client sender machine to a client recipient machine comprising the steps of:

entering a user identifier; and transmitting said user identifier to an encryption server to verify identity of said user; and downloading an Enabler computer program from said encryption server to said client sender's machine, wherein said Enabler computer program is executable to communicate with a Server computer program located on said encryption server to:

allow said user to enter a user identifier;

transmit said user identifier to said encryption server to verify identity of said user;

receive a private key encrypted with a passphrase from a database located in a memory of said encryption server, said private key having a corresponding public key, thereby forming a public/private key pair;

use said passphrase to decrypt said encrypted private key said client computer;

*receive a first encrypted digital message from another user encrypted using a public key corresponding to said private key;* decrypt the first encrypted digital message to create a first digital message using said private key;

*generate a second digital message;* retrieve a user recipient's public key from said encryption server database;

encrypt [a] *the second* digital message with said user recipient's public key *to create a second encrypted digital message*; and transmit said *second* encrypted digital message to said user recipient; and wherein said *second* encrypted digital message is transmitted from said client sender machine to said encryption server, then transmitted from said encryption server to said client recipient machine, *and*

*wherein said public key corresponding to said private key is downloaded from said encryption server by said another user.*

\* \* \* \* \*